United States Patent [19]

Takahashi

[11] Patent Number: 4,731,720

[45] Date of Patent: Mar. 15, 1988

[54] HIGH-VOLTAGE POWER SOURCE APPARATUS

[75] Inventor: Kazuyoshi Takahashi, Kawasaki, Japan

[73] Assignee: Canon Kabushiki Kaisha, Tokyo, Japan

[21] Appl. No.: 792,254

[22] Filed: Oct. 28, 1985

[30] Foreign Application Priority Data

| Nov. 2, 1984 | [JP] | Japan | 59-230092 |
| Nov. 2, 1984 | [JP] | Japan | 59-230093 |
| Nov. 2, 1984 | [JP] | Japan | 59-230094 |
| Nov. 2, 1984 | [JP] | Japan | 59-230095 |
| Dec. 26, 1984 | [JP] | Japan | 59-273455 |
| Dec. 26, 1984 | [JP] | Japan | 59-273456 |
| Dec. 26, 1984 | [JP] | Japan | 59-273457 |

[51] Int. Cl.$^4$ ............................................. H02M 3/335
[52] U.S. Cl. ........................................ 363/21; 363/71; 307/2
[58] Field of Search ................ 363/21, 25, 26, 71; 307/2

[56] References Cited

U.S. PATENT DOCUMENTS

| 3,771,040 | 11/1973 | Fletcher et al. | 363/21 |
| 3,947,747 | 3/1976 | Smith | 363/25 |
| 4,073,003 | 2/1978 | Chambers | 363/21 |
| 4,104,714 | 8/1978 | Smith et al. | 363/21 |
| 4,128,868 | 12/1978 | Gamble | 363/26 |
| 4,318,165 | 3/1982 | Kornrumpf et al. | 363/21 |
| 4,330,816 | 5/1982 | Imazeki et al. | 363/21 |
| 4,386,311 | 5/1983 | Bafaro | 363/21 |
| 4,408,267 | 10/1983 | Pruitt | 363/25 |
| 4,447,866 | 5/1984 | Reeves | 363/21 |
| 4,562,548 | 12/1985 | Andersen et al. | 363/21 |

*Primary Examiner*—Patrick R. Salce
*Assistant Examiner*—Jeffrey Sterrett
*Attorney, Agent, or Firm*—Fitzpatrick, Cella, Harper & Scinto

[57] ABSTRACT

A high-voltage power source apparatus has a step-up transformer for producing a high-voltage output, a rectifier/smoothing circuit for rectifying and smoothing the high-voltage output from the transformer, and a control section including a constant current or voltage control circuit for changing the output magnitude at a predetermined frequency and for obtaining a constant load current or voltage.

11 Claims, 33 Drawing Figures

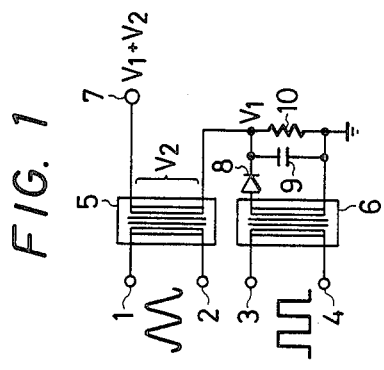

HIGH-VOLTAGE POWER SOURCE APPARATUS

BACKGROUND OF THE INVENTION

1. Field of the Invention

The present invention relates to a high-voltage power source apparatus and, more particularly, to a high-voltage power source apparatus for use in a copying machine, a printer, a television, or the like.

2. Description of the Prior Art

As one type of conventional high-voltage power source apparatuses, a circuit as shown in FIG. 1 is frequently used in controlling a charger in a copying machine.

The circuit shown in FIG. 1 generates a high-voltage current obtained by superposing a desired AC voltage on a high DC voltage. A rectangular wave (or sine wave) pulse is supplied from terminals 3 and 4 to a step-up transformer 6. Then, an AC voltage stepped up in accordance with the turn ratio is induced in the secondary winding. The AC voltage is rectified and smoothed into a high DC voltage V1 by a rectifier consisting of a diode 8, a capacitor 9 and a load resistor 10.

An AC voltage of a frequency determined in accordance with the control characteristics of a desired load is applied to a transformer 5 from terminals 1 and 2. The high DC voltage from the transformer 6 is applied to one end of the secondary windinq of the transformer 5. Therefore, a voltage (V1+V2) is generated at the secondary winding of the transformer 5. The voltage is obtained by superposing the DC voltage V1 and an AC voltage V2 obtained by stepping up the AC voltage supplied from the terminals 1 and 2 (the voltages V1 and V2 are shown in FIG. 2). The voltage (V1+V2) is supplied to a load through an output terminal 7.

As shown in FIG. 2, the output voltage is a voltage which is obtained by superposing an AC voltage stepped up by the transformer 5 to the voltage V1 stepped up by the transformer 6.

The above-described conventional circuit for generating an AC voltage requires two transformers for the DC and AC voltages. Therefore, the circuit is expensive. Furthermore, since transformers are relatively large in size, the overall circuit becomes large in size. The DC voltage V1 as shown in FIG. 2 is frequently high, e.g., several kV. This results in a considerably high cost for insulation between the primary and secondary windings of the transformer 5 and for insulation between the high- and low-voltage portions. When a superposing AC voltage of a low frequency is to be obtained in order to obtain desired load control characteristics, the transformer 5 must be rendered large in size in order to prevent magnetic saturation of the transformer 5. This also results in making the overall circuit heavy.

SUMMARY OF THE INVENTION

The present invention has been made in consideration of this and has as an object to provide an improved high-voltage power source apparatus.

It is another object of the present invention to provide a compact high-voltage power source apparatus.

It is still another object of the present invention to provide a lightweight high-voltage power source apparatus.

It is still another object of the present invention to provide an inexpensive and compact high-voltage power source apparatus.

The above and other objects, features and advantages of the present invention will become apparent from the following description when taken in conjunction with the accompanying drawings.

BRIEF DESCRIPTION OF THE DRAWINGS

FIG. 1 is a circuit diagram showing the configuration of a conventional high-voltage power source apparatus;

FIG. 2 is a waveform chart of an output in the circuit shown in FIG. 1;

FIG. 3 is a circuit diagram showing the configuration of a high-voltage power source circuit according to the present invention;

FIG. 4 is a circuit diagram showing in detail the configuration of an AC oscillator in FIG. 3;

DETAILED DESCRIPTION OF THE PREFERRED EMBODIMENTS

Figure 5:
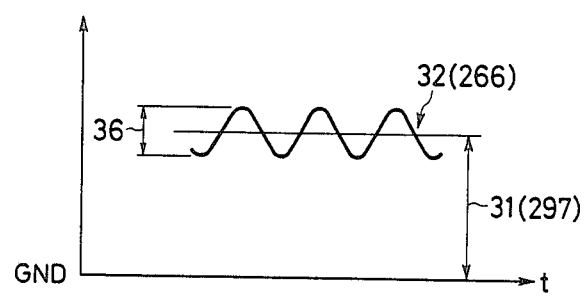
FIG. 5 is a waveform chart of an output from the AC oscillator.

The present invention will now be described in detail with reference to the accompanying drawings.

FIG. 3 shows the configuration of a power source apparatus according to an embodiment of the present invention. One end of the primary winding of a step-up transformer 14 receives a low DC voltage Vcc through a filter consisting of a resistor 12 and an electrolytic capacitor 13. The other end of the primary winding is connected to the collector of a switching transistor 28. The switching transistor 28 controls the power supply to the primary winding of the transformer 14.

A rectifier/smoothing circuit consisting of a diode 15, a capacitor 16 and a discharging resistor 17 is connected to the secondary winding of the transformer 14. The voltage stepped up by the transformer 14 is converted to a DC voltage and is supplied to a load 18. A load current flowing into the load 18 is detected as a voltage by a detection resistor 19. The detected voltage is integrated (smoothed) by a capacitor 20, and is supplied to the non-inverting input terminal of an error amplifier 25 consisting of an operational amplifier or the like through a bias circuit consisting of resistors 21 and 22. The resistors 19 to 22 and the capacitor 20 constitute a high-voltage current detection circuit 29.

A reference voltage obtained by dividing a low power source voltage Vcc by resistors 23 and 24 constituting a reference voltage generator 30 is applied to the inverting input terminal of the error amplifier 25. An output 31 from the error amplifier 25 is supplied to an AC oscillator 26 so as to control it.

FIG. 4 shows a detailed configuration of the AC oscillator 26.

The output 31 from the error amplifier 25 is supplied to a comparator circuit consisting of an operational amplifier 57 and resistors 54 and 55. The comparator circuit compares the input voltage with an output voltage 32 from the AC oscillator 26, and generates a rectangular wave. The gain of the rectangular wave is adjusted to a predetermined level by a variable resistor 52 and a resistor 53. The gain-controlled rectangular wave is supplied to a filter circuit consisting of resistors 47, 48 and 50, capacitors 46, 49 and 51 and an operational amplifier 56. A sine wave obtained by superposing the rectangular wave on the input 31 is thus obtained.

FIG. 5 shows the waveform of the superposed voltage. FIG. 5 shows an error voltage output 31 from the error amplifier 25, and also an output 32 which is obtained by superposing a sine wave having an amplitude 36 to the voltage 31.

The sine wave 32 generated by the AC oscillator 26 is supplied to a PWM (pulse width modulator) 27. A rectangular wave 33 generated by the PWM 27 is supplied to the base of a switching transistor 28. The PWM 27 controls the switching pulse width of the transistor 28 in accordance with the load current.

Figure 6:
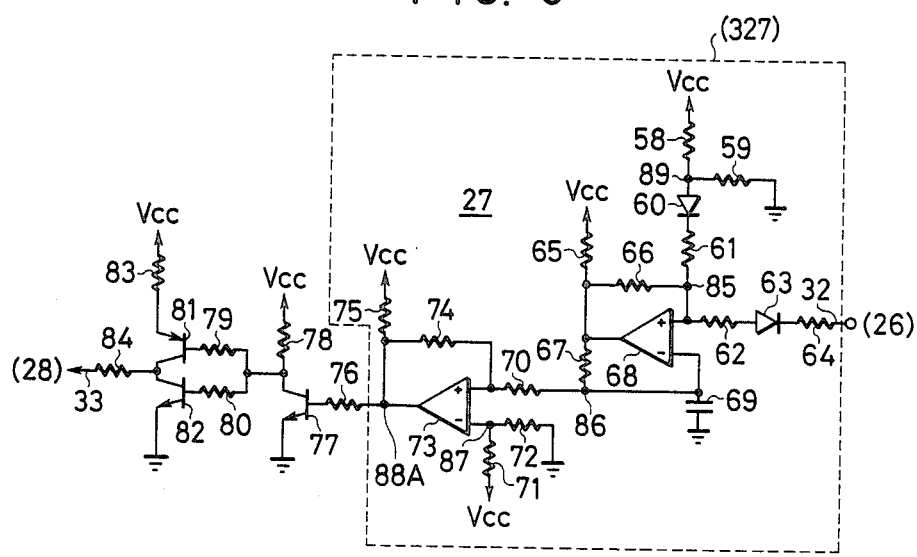
FIG. 6 is a circuit diagram showing in detail the configuration of a PWM in FIG. 3.

FIG. 6 shows the detail of the configuration of the PWM 27.

An output from the AC oscillator 26 is supplied to the non-inverting input terminal of a comparator as a triangular wave generator through a series circuit of a resistor 64, a diode 63 and a resistor 62. A voltage at a voltage dividing point 89 of resistors 58 and 59 of the power source voltage Vcc is connected to the non-inverting input terminal of an operational amplifier 68 through a diode 60 and a resistor 61. The inverting input terminal of the comparator 68 is grounded through a capacitor 69.

The output terminal of the comparator 68 is pulled up to the power source voltage through a resistor 65 and is positively fed back to the non-inverting input terminal through a feedback resistor 66.

The output terminal of the comparator 68 is connected to the non-inverting input terminal of an operational amplifier 73 through resistors 67 and 70. The node between the resistors 67 and 70 is connected to the non-inverting input terminal of the comparator 68.

A voltage at a voltage dividing point 87 of resistors 71 and 72 of the power source voltage Vcc is applied to the inverting input terminal of the comparator 73. The comparator 73 has a feedback resistor 74, and its output is pulled up to the power source voltage by a resistor 75. The output of the comparator 73 is connected to the base of a transistor 77 through a resistor 76.

The emitter of the transistor 77 is grounded, and its collector is connected to the power source voltage Vcc through a resistor 78. The collector of a transistor 77 is connected, through resistors 79 and 80, to the bases of series-connected transistors 81 and 82. The emitter of the transistor 81 is connected to the power source voltage through a resistor 83, and the emitter of the transistor 82 is grounded. The voltage at the node of the collector and emitter of the transistors 81 and 82, respectively, is applied to the base of the switching transistor 28 through a resistor 84.

Figure 7:
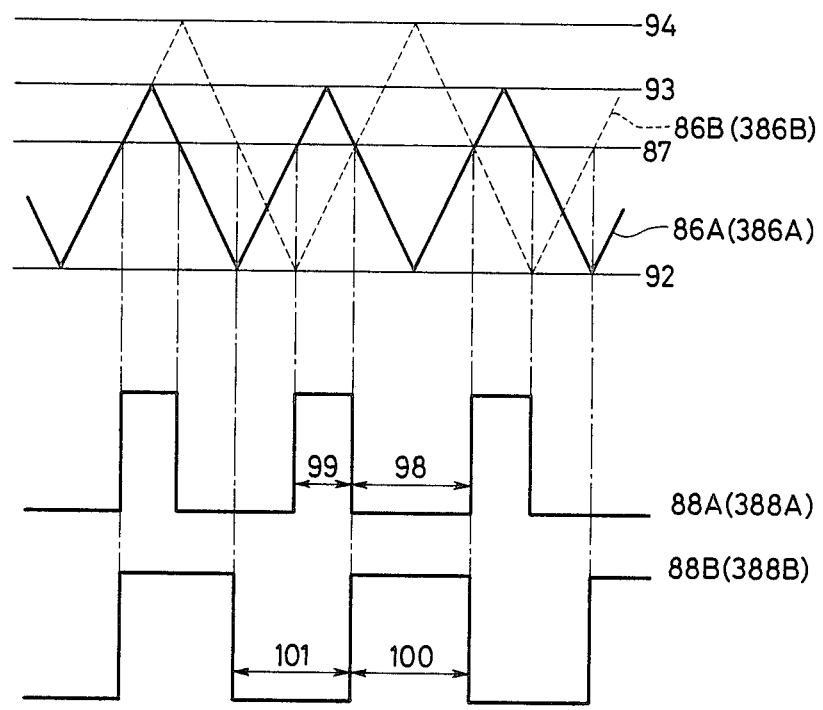
FIG. 7 is a waveform chart at respective points in FIG. 6.

FIG. 7 shows voltages at the respective nodes in FIG. 6.

Referring to FIG. 7, waves 86A and 86B respectively show different potential changes at a node 86. A potential 92 of the lower peak of the triangular wave is uniquely determined by:

$$V92 = (V89 - Vf)\{R66/(R61+R66)\}$$

where R is the resistance, V is the voltage and Vf is the forward potential of the diode when the output from the comparator 68 is at low level. Each suffix represents each resistor or node (this also applied to equations to be presented below).

Potentials 93 and 94 at the upper peaks of the triangular wave are potentials obtianed when the output from the comparator is at high level, and are controlled by the level of an output voltage 32 from the AC oscillator 26. At this time, the potential 92 is given by:

$$V92(Vcc - V32 - Vf)\{(R62+R64)/(R65+R66+R62+R64)\} + V32 + Vf$$

The potential 92 changes in accordance with the potential V32 and assumes a potential 93 or 94. The slope of the triangular wave at the node 86 is determined by the time constant of the resistor 67 and the capacitor 69.

A potential 87 is a potential at a node 87 and is uniquely given by:

$$V95 = V87 = Vcc\{R72/(R71+R72)\}$$

A rectangular pulse wave as indicated by symbols 88A and 88B is obtained by comparing the potential 87 and the potential 86 by the comparator 87.

When the voltage at the node 86 is the waveform 86A, the output waveform of the comparator 73 has the waveform 88A. When the voltage at the node 86 has the waveform 86B, the output waveform of the comparator 73 has the waveform 88B.

As described above, since the lower peak potential 92 of the triangular wave, the potential at the node 87 and the time constant defined by the resistor 67 and the capacitor 69 are constant, the output OFF time of the comparator 73 is constant as indicated by numerals 98 and 101 in FIG. 7 irrespective of changes in the output 32 of the AC oscillator 26. The ON time of the comparator 73 is adjusted as indicated by numerals 99 and 100 in accordance with an output from the AC oscillator 26.

The rectangular pulse obtained in this manner is amplified at a predetermined gain by a current amplifier circuit consisting of transistors 77, 81 and 82 and resistors 76, 78 to 80, 83 and 84. A large-current switching transistor 28 is thus driven.

Figure 8:
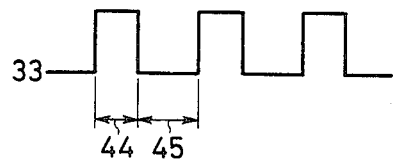
FIG. 8 is a waveform chart of an output of the PWM.

FIG. 8 schematically shows the output waveform of the PWM 27. The output waveform 33 of the PWM 27 has a constant OFF time 45 and has an ON time 44 which is controlled by the output 32 of the AC oscillator 26.

The mode of operation of the apparatus having the above-mentioned configuration will be described below.

Referring to FIG. 3, a high-voltage current flowing through the load 18 is entirely returned to the transformer through the resistor 19. The current is detected by the detection resistor 19 and is integrated by the capacitor. The potential is a negative potential and deviates from the operating range of the error amplifier 25. Therefore, a bias is applied by the resistor 21 and 22, and a potential shifted to the operation range of the error amplifier 25 is supplied thereto.

The error amplifier 25 compares the reference potential obtained by the resistors 23 and 24 and the input received at the non-inverting input terminal thereto. If the voltage at the non-inverting input terminal is high, the error amplifier 25 produces an output of high level. Otherwise, the error amplifier 25 generates an output of low level. The two outputs have the same absolute magnitudes and are stable.

Figure 9:
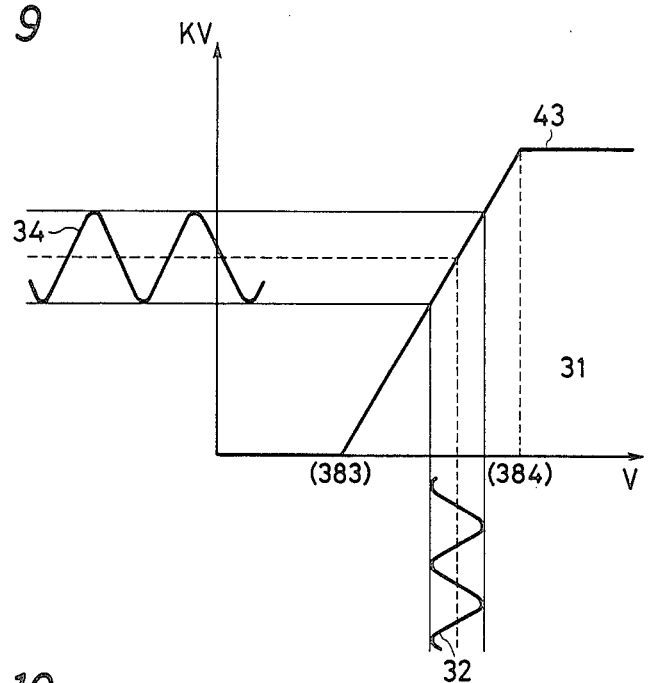
FIG. 9 is a diagram showing input/output characteristics in the apparatus according to the present invention.

As shown in FIG. 5, the sine wave generated by the AC oscillator 26 is superposed on the output 31 from the error amplifier 25 and a wave 32 is obtained. FIG. 9 shows the relationship between the wave 32 and the high-voltage output at the node 34 shown in FIG. 3. In FIG. 9, the abscissa represents the voltage of the output 32 of the AC oscillator 26, and the ordinate represents the voltage of the high-voltage output 34. The gain of the PWM 27 and the step-up transformer 14 is linear as shown by a line 43. When the sine wave is supplied to the PWM 27, a sine wave level-shifted to a high voltage appears at the node 34.

In this manner, in a high-voltage power source having a constant current output such that a predetermined integrated value of a high-voltage output can be obtained, an output equivalent to a high-voltage output obtained by superposing an AC voltage by a conventional AC superposition system can be obtained. With the above-described configuration, an output waveform equivalent to a conventional circuit can be obtained by changing the magnitude of the high-voltage output at a predetermined frequency. Therefore, a transformer used in an AC system in a conventional power source apparatus can be omitted, and the power source apparatus can therefore be rendered compact in size. Naturally, since a transformer of the AC system is not used and a limitation due to the large size of a transformer is not imposed, design is easy. Furthermore, since the number of nodes handling high-voltages is small, insulation of such nodes with other portions of the circuit is easy and the overall cost can be reduced.

The above description has been made in consideration of a high-voltage power source apparatus wherein constant current control for obtaining a constant load current is performed. However, the present invention can be practiced in a high-voltage power source apparatus in which a constant load voltage is to be obtained.

Figure 10:
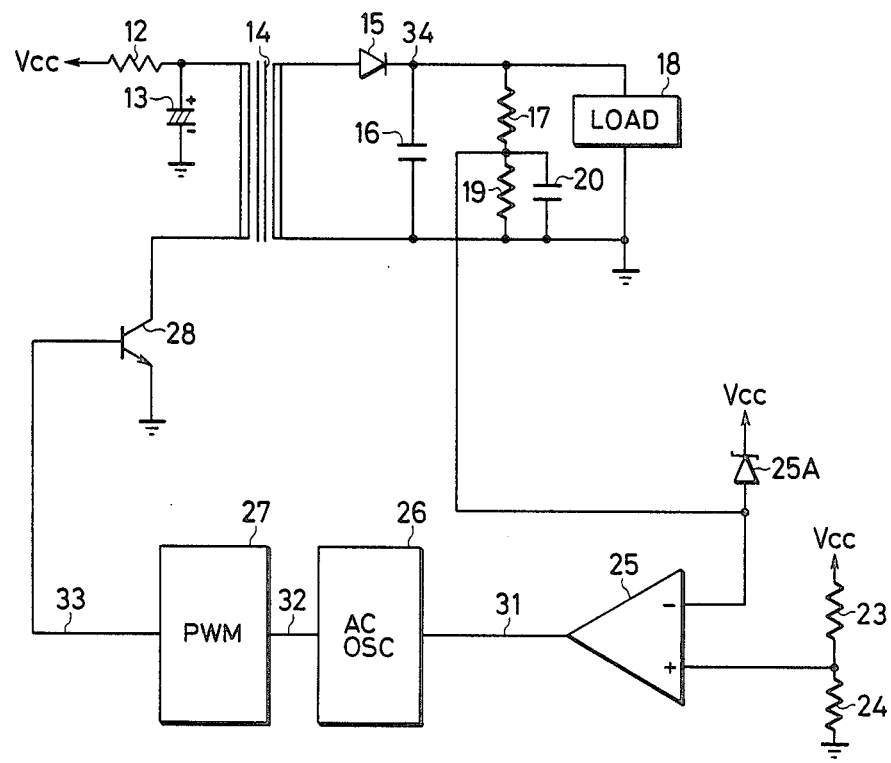
FIG. 10 is a circuit diagram showing another embodiment of the present invention.

FIG. 10 shows an embodiment corresponding to that shown in FIG. 3 and for performing constant voltage control. The same reference numerals as in FIG. 3 denote the same parts in FIG. 10, and a detailed description thereof will be omitted.

In the embodiment shown in FIG. 10, the voltage supplied to the error amplifier 25 is a voltage corresponding to the load voltage. That is, the inverting input terminal of the error amplifier 25 receives a potential which is obtained by dividing the application voltage of the load 18 by the resistors 17 and 29 and integrating the divided voltage by the capacitor 20. The inverting input terminal of the error amplifier 25 is pulled up by a Zener diode 25A. The Zener diode 25A is a circuit corresponding to the resistors 21 and 22 shown in FIG. 3, and the Zener voltage serves to keep the input voltage within the operating range of the error amplifier 25. The reference voltage obtained by dividing the power source voltage Vcc by the resistors 23 and 24 is applied to the non-inverting input terminal of the error amplifier 25. In this embodiment, the error amplifier 25 produces an output signal between the load voltage and a predetermined reference voltage determined in correspondence with the division-ratio of the resistors 23 and 24.

The operation of the AC oscillator 26 and the PWM 27 connected to the output stage of the error amplifier 25 is the same as described above. Therefore, according to the present invention, the same effect as in the previous emboidment can be obtained in a high-voltage power source having a constant voltage output having a predetermined integrated value.

In the above embodiment, a high-voltage output is controlled by controlling the low-voltage power source at the primary winding side of the step-up transformer. However, according to a modification, the switching transistor can be switched at a fixed frequency, and power of the primary side low-voltage power source of the step-up transformer can be controlled.

Figure 11:
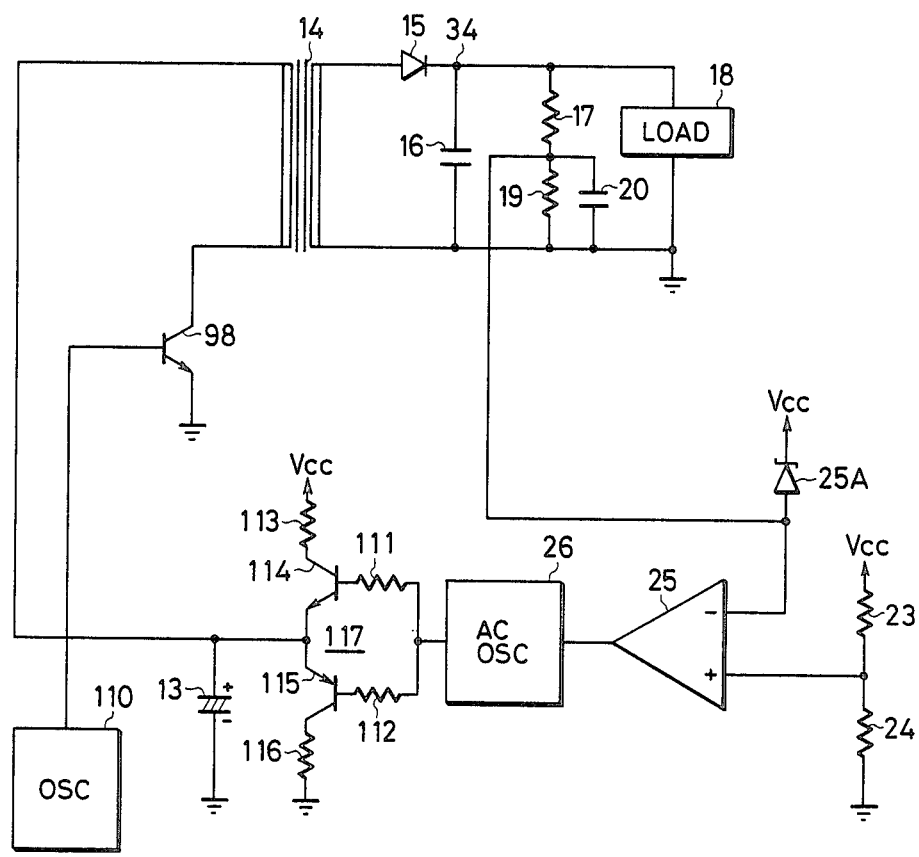
FIG. 11 is a circuit diagram showing the configuration of a modification of the embodiment shown in FIG. 10.

FIG. 11 shows the configuration of this modification. Referring to FIG. 11, the switching transistor 28 is oscillated by an oscillator 110 having a fixed frequency, and controls the power source voltage Vcc applied to the other end of the step-up transformer 14 by a series regulator 117. The operation of the series regulator 117 is controlled by the error amplifier 25 and the AC oscillator 26 having the same configuration as shown in FIG. 10.

Figure 12:
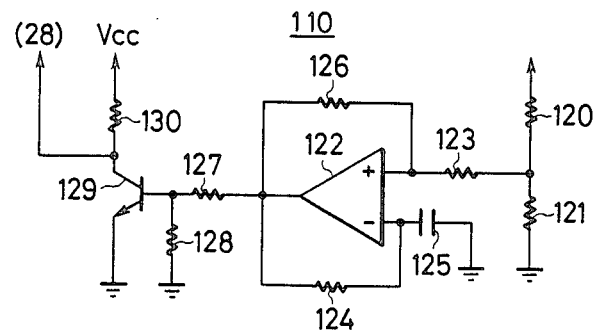
FIG. 12 is a circuit diagram showing the configuration of an oscillator shown in FIG. 11.

FIG. 12 shows an example of the configuration of the circuit of the oscillator 110. The oscillator 110 has an operational amplifier 122. A threshold voltage obtained by resistors 120 to 123 is supplied to the non-inverting input terminal of the operational amplifier 122, and its own output is fed back through a resistor 126. A time constant circuit consisting of a resistor 124 and a capacitor 125 for defining the frequency is connected between the output terminal and the inverting input terminal of the operational amplifier 122. The pulse wave generated by the operational amplifier 122 is supplied to the base of a switching transistor 129 for current amplification through a resistor 127. The collector of a transistor 129 is connected to the power source voltage Vcc through a current limiting resistor 130 and is also connected to the base of the switching transistor 28.

Figure 13:
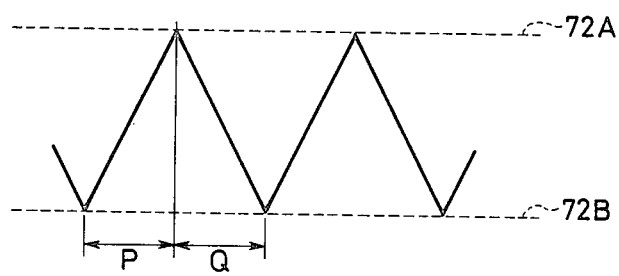
FIG. 13 is a diagram showing the waveform of a voltage appearing at the inverting input terminal of an operational amplifier shown in FIG. 12.

In such an oscillator circuit, the operational amplifier 122 repeatedly generates outputs of high and low levels with reference to the threshold voltage, thereby generating a rectangular wave pulse. FIG. 13 shows the waveform of a signal at the inverting input terminal of the operational amplifier 12. The waveform has input threshold voltage levels 72A and 72B at the non-inverting input of the operational amplifier 122. The capacitor 125 is charged in a high-level interval P. Therefore, in this interval, the voltage at the inverting input terminal increases in accordance with the time constant. When the voltage reaches the level 72A, the amplifier output is switched to a low level. In a low-level interval Q, the capacitor 125 is discharged and the voltage at the inverting input terminal is decreased. In this interval, the threshold voltage at the non-inverting input terminal is set at level 72B by the feed-back resistor 126. When the voltage at the inverting input terminal reaches the level 72B, the operational amplifier 122 is switched again. This operation is repeated to switch the transistor 129. The current-amplified output from the transistor 129 drives the switching transistor 28, shown in FIG. 11.

One end of the primary winding of the step-up transformer 14 at the opposite side of the transistor 28 is connected to the series regulator 117 consisting of transistors 114 and 115 and resistors 111 to 113 and 115. The AC oscillator 26 as described above is connected to the input terminal of the series regulator 17, and a sine wave for obtaining a constant sine wave is supplied. The series regulator 117 changes power supplied to the step-up transformer 14 from the power source in accordance with the input sine wave. Referring to FIG. 11, the circuit has a smoothing capacitor.

With the above configuration, a high voltage can be induced at the secondary winding side. The same effect as described above can be obtained.

Figure 14:
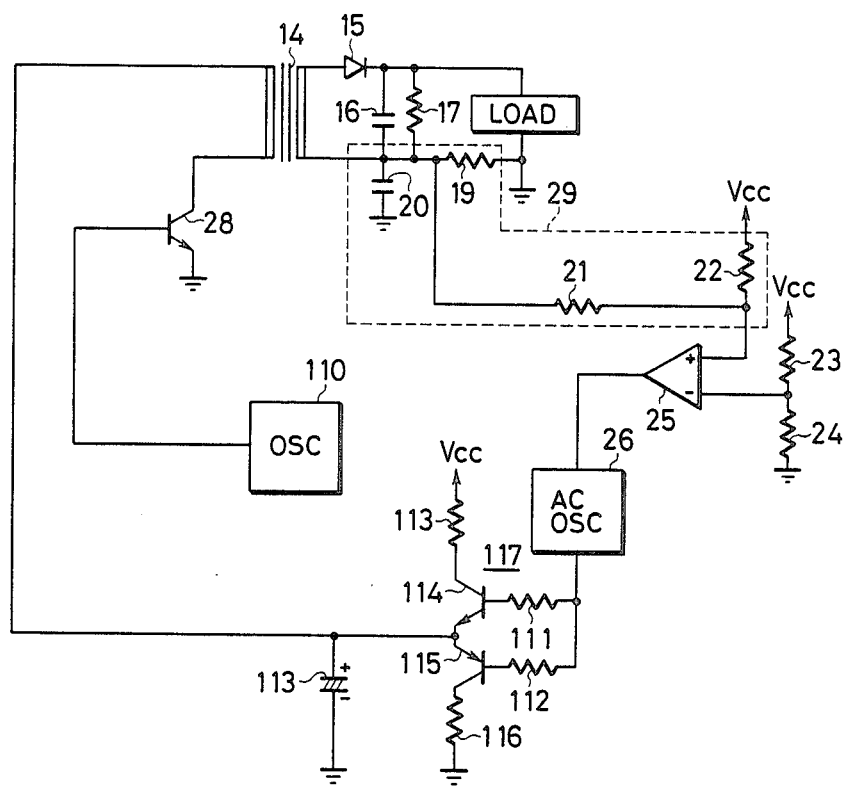
FIG. 14 is a circuit diagram showing the configuration of a modification of the embodiment shown in FIG. 11.

FIG. 11 shows a configuration for constant voltage control of a load voltage at the secondary side in an averaged manner. However, as shown in FIG. 14, a high-voltage current detection circuit similar to one indicated by reference numeral 29 in FIG. 3 can be used as an output detection circuit at the secondary side, and an output from the high-voltage current detection circuit 29 can be supplied to an error amplifier 25. Constant current output control can also be performed in a configuration for performing constant voltage power supply at the primary side using a series regulator of such a configuration.

In the configuration shown in FIG. 11, power supply at the primary side of the step-up transformer is controlled using a series regulator. However, as shown in FIGS. 15 and 16, power supply at the primary side can be performed by a switching regulator, and the regulator can be controlled in accordance with a load.

Figure 15:
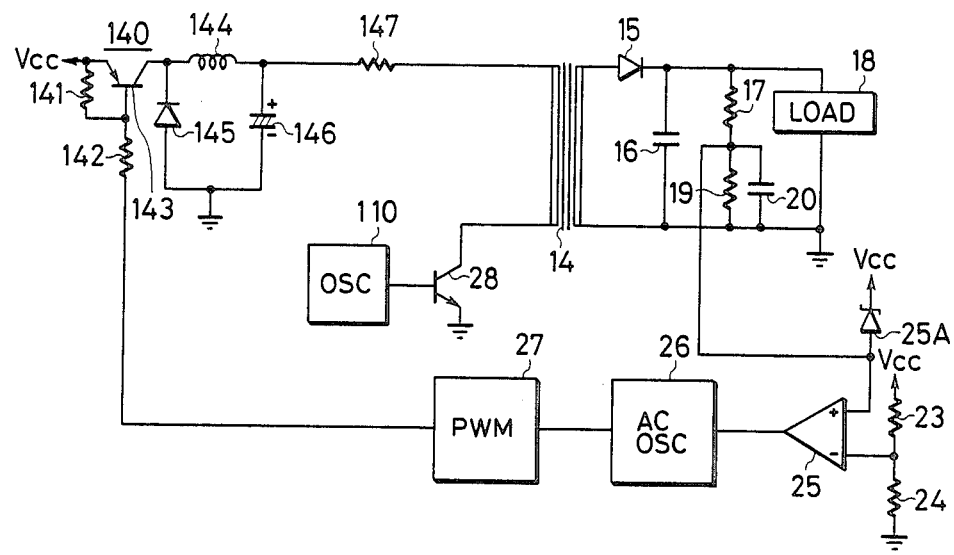
FIGS. 15 and 16 are circuit diagrams showing the configurations of modifications of the embodiment shown in FIG. 11.
Figure 16:
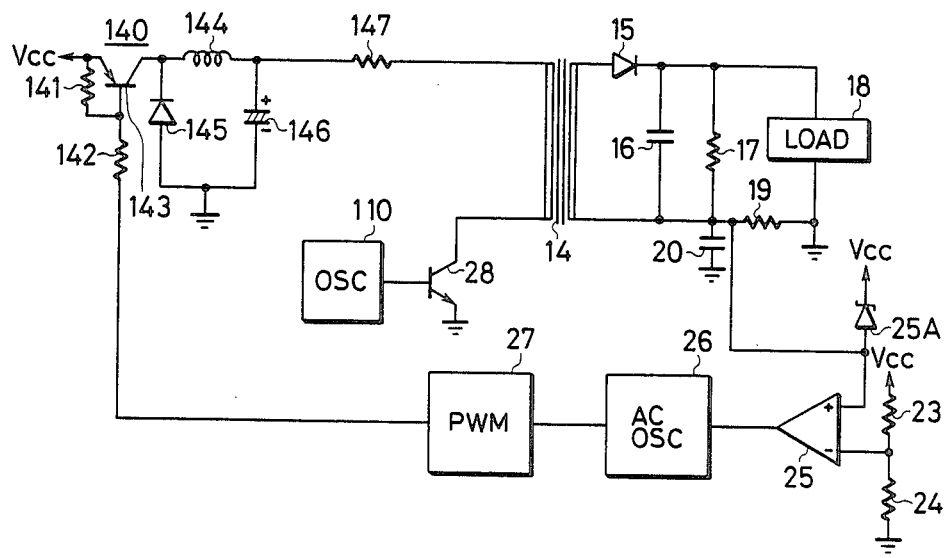

Referring to FIGS. 15 and 16, an oscillator 110 and a transistor 28 are connected to one end of the primary winding of the step-up transformer. A known step down chopper type switching regulator consisting of a transistor 143, resistors 141, 142 and 147, a high-speed diode 145, a capacitor 146 and a choke coil 144 is connected to the other end of the primary winding of the step-up transformer. The base current of an oscillating transistor 143 constituting the switching regulator 140 is controlled by an error amplifier 25, an oscillator 26, and a PWM 27 similar to those shown in FIG. 3.

An embodiment shown in FIG. 15 is for performing constant voltage control of a load voltage at the secondary side in an averaged manner, and an embodiment shown in FIG. 16 is for performing constant current control of a load current at the secondary side. In the embodiment shown in FIG. 15, as in FIG. 10, a voltage obtained by voltage division by the resistors 17 and 19 is supplied to the error amplifier 25. In the embodiment shown in FIG. 16, as in the case of FIG. 3, a voltage corresponding to a load current detected through the resistor 19 is supplied to the error amplifier 25.

With this configuration, a high-voltage output magnitude can be oscillated at a predetermined frequency by controlling the power supply ratio at the primary side of the step-up transformer 14. In addition, the load voltage or current can be controlled to be constant in an averaged manner.

It is also possible to change the magnitude of the high-voltage DC output using a switching regulator system and to superpose an AC output on the high-voltage DC output.

Figure 17:
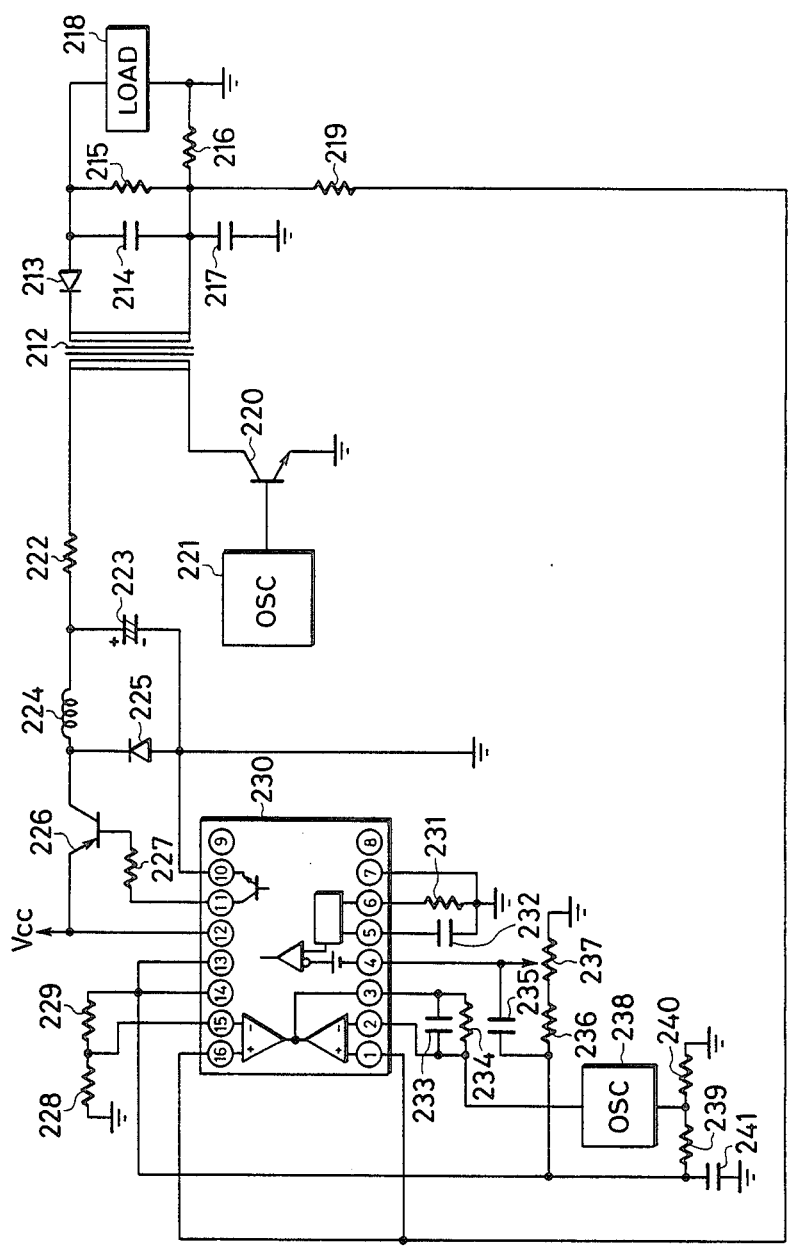
FIG. 17 is a circuit diagram showing the configuration of a high-voltage power source circuit using a switching regulator system.

FIG. 17 shows the configuration of this power source apparatus. Referring to FIG. 17, the collector of a switching transistor 220 is connected to one end of the primary winding of a step-up transformer 212. The switching transistor 220 controls power supply to the primary side of the step-up transformer 212. The base of the transistor 220 is controlled by an output from an oscillator 221.

The other end of the primary side of the step-up transformer 212 is connected to a known chopper type switching regulator consisting of a transistor 226, resistors 222 and 227 to 229, a diode 225, a choke coil 224, and a smoothing capacitor 223. The switching regulator is controlled by a control IC 230 as will be described in detail later.

A rectifier/smoothing circuit consisting of a diode 213, a capacitor 214 and a discharging resistor 215 is connected to the secondary side of the step-up transformer 212. A voltage stepped up by the step-up transformer 212 is converted into a DC voltage and is supplied to a load 218. A load current flowing to the load 218 is detected as a voltage through a detection registor 216. The detected voltage is integrated (smoothed) by a capacitor 217, and fed back to the 1st and 16th pins of the control IC 230 through an overcurrent protection resistor 219.

The control IC 230 has 16 pins, as illustrated, and controls the switching operation of the switching regulator in accordance with a control input. The switching regulator is connected to the 10th to 12th pins. A resistor 231 and a capacitor 232 connected to the 5th and 6th pins provide a time constant determining the switching frequency. A resistor 234 and a capacitor 233 connected to the 2nd and 3rd pins constitute a feedback circuit of an error amplifier in the IC 230. Resistors 236 and 237 are for controlling the dead time of the IC 230, and a capacitor 230 is for removing ripples.

The output terminal of an oscillator 238 is connected to the 2nd pin of the IC 230, i.e., the inverting input terminal of the error amplifier. The configuration of the oscillator will be described in detail. An output voltage from the oscillator 238 is determined by resistors 239 and 240. A capacitor 241 is for removing ripples.

Figure 18:
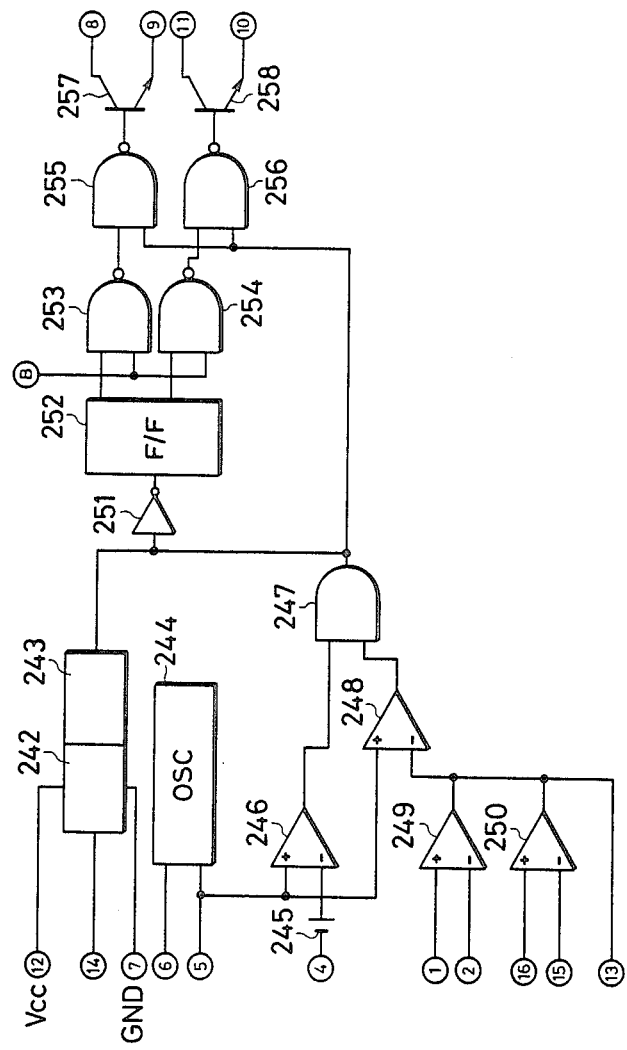
FIG. 18 is a block diagram showing in detail the configuration of part of the circuit shown in FIG. 18.

FIG. 18 shows in detail the internal structure of the switching regulator control IC 230 shown in FIG. 17.

Referring to FIG. 18, a reference regulator 242 connected to the 7th and 12th pins generates a reference voltage of 5 V. The IC 230 further includes a low-voltage stop 243, an oscillator 244, a power source 245 of 0.1 V, a dead time comparator 246, an AND gate 247, a PWM (pulse width modulation) comparator 248, error amplifiers 249 and 250, an inverter 251, a T flip-flop 252, AND gates 253 and 254, and current-amplification transistors 257 and 258.

Figure 19A:
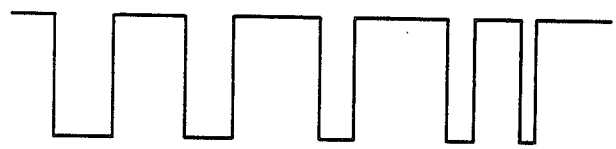
FIGS. 19(A), 19(B), and 19(C) are waveform charts of an output from each portion of the circuit shown in FIG. 18.
Figure 19B:
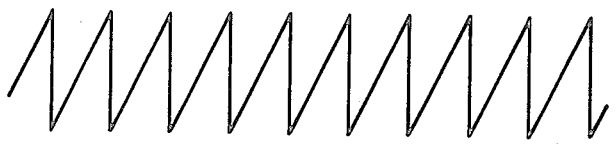
Figure 19C:

FIGS. 19(A) to 19(C) show waveforms at respective parts of the IC 230 in FIG. 16.

FIG. 19(A) shows an output waveform of the 11th pin, FIG. 19(B) shows an output waveform of the 5th pin, i.e., a waveform defined by the time constant determined by a resistor 231 and a capacitor 232 connected to an oscillator 244, and FIG. 19(C) shows a waveform of the 3rd pin, i.e., the input waveform of the PWM comparator.

The oscillator 238, shown in FIG. 15, has the same configuration as the of the oscillator 26 shown in FIG. 4. A line 32 is connected to the 2nd pin of the IC 230, and a line 33 is connected between resistors 239 and 240.

Since the oscillator 221 has the same configuration as the oscillator 110 in FIG. 12 and operates in the same manner, a description thereof will be omitted.

The mode of operation of the apparatus having the above configuration will be described below.

Referring to FIG. 15, a high-voltage current flowing through the load 218 is entirely returned to the transformer through the resistor 216. The current is detected by the resistor 216 and integrated by the capacitor 217. A voltage corresponding to the load current is compared with a reference voltage by the error amplifier constituted by operational amplifiers 249 and 250 in the control IC 230. The operational amplifier 249 serves for constant current control, and the operational amplifier 250 serves for overcurrent protection.

As shown in FIG. 5, the potential at the inverting input terminal of the operational amplifier 249 has a voltage waveform in which a sine wave 266 from the oscillator 238 is superposed on a potential 297 divided by the resistors 239 and 240.

The control IC 230 supplies a detected voltage corresponding to the load current (or voltage) to the internal error amplifier, and controls the output from the switching regulator so as to obtain a constant load current (or voltage). A signal obtained by superposing a sine wave to the detected voltage is supplied as a reference voltage of the error amplifier in the control IC, so that power generated by the switching regulator is changed and the high-voltage output at the secondary side is oscillated.

Figure 20:
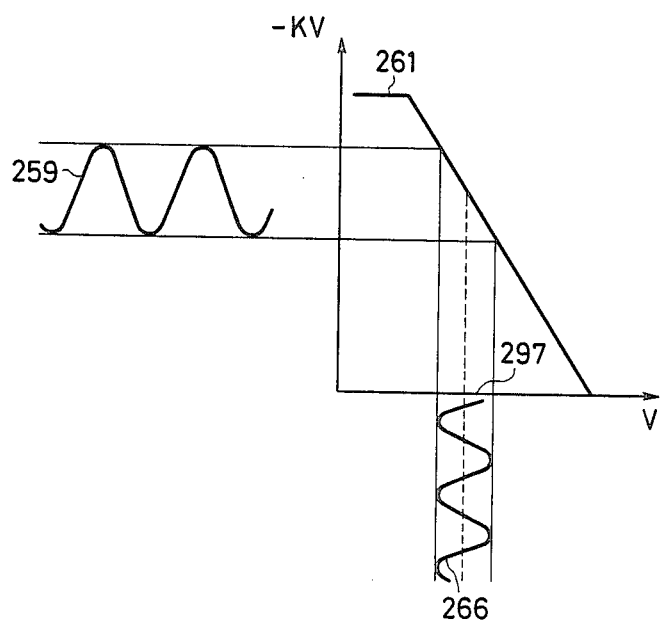
FIG. 20 is a diagram showing the input/output characteristics in FIG. 17.

FIG. 20 shows the input/output characteristics of the emboidment.

The abscissa indicates the voltage at the 2nd pin of the control IC 230, and the ordinate indicates the high-voltage output voltage. A dotted line 297 indicates a reference voltage obtained by the resistors 239 and 240. As described above, the control voltage applied to the control IC is vertically oscillated with reference to the voltage 297 by the oscillator 238. The gain of the switching regulator comprising the transistor 226 has a linear characteristic curve 261. Thus, when the sine wave is applied to the control IC 230, a high-voltage waveform 259 obtained by superposition of an AC voltage appears at the anode of the diode 213 shown in FIG. 15.

In this manner, in a high-voltage power source having a constant current output with a predetermined integrated value, an output equivalent to high-voltage output obtained by superposing an AC voltage by a conventional AC superposition system can be obtained. With the above configuration, the magnitude of the high-voltage output is changed at a predetermined frequency to obtain an output waveform equivalent to a conventional waveform. Therefore, a conventional transformer for the AC system can be omitted, and the size of the power source section can be reduced. Since the transformer for the AC system is not used, even if an AC voltage to be superposed has a low frequency, a limitation due to the size of the transformer need not be considered and design is easy. Since the number of nodes kept at high potentials is small, insulation of such nodes from other circuit portions at low potentials can be facilitated and the cost can be reduced.

The above description has been made with reference to embodiments of high-voltage power source apparatuses for performing constant current control for obtaining a constant load current. However, the present invention is similarly applicable to high-voltage power source apparatuses for obtaining a constant load voltage. When constant voltage control is performed, a voltage-dividing registor is inserted in parallel with the load 218 to obtain a detected voltage corresponding to the load voltage. The detected voltage can be used as a control input of the control IC, as described above.

In the embodiments described above, an AC waveform output from the oscillator is a sine wave. However, it can be any other wave such as a rectangular wave, a sawtooth wave or triangular wave. Then, output magnitude can be changed in a desired pattern in accordance with the type of a load. This type of control corresponds to the operation of superposing an AC output of a desired waveform on a high-voltage output, when considered from the conventional technical principle. Although the waveform of the oscillator 26 has a constant frequency in the above embodiments, it can be changed in accordance with desired load characteristics.

Alternatively, outputs of two positive and negative high-voltage DC power sources can be series-connected, and the magnitudes of the outputs can be modulated at a constant frequency to have a phase difference of 180°, so that a high-voltage AC output can be obtained.

Figure 21:
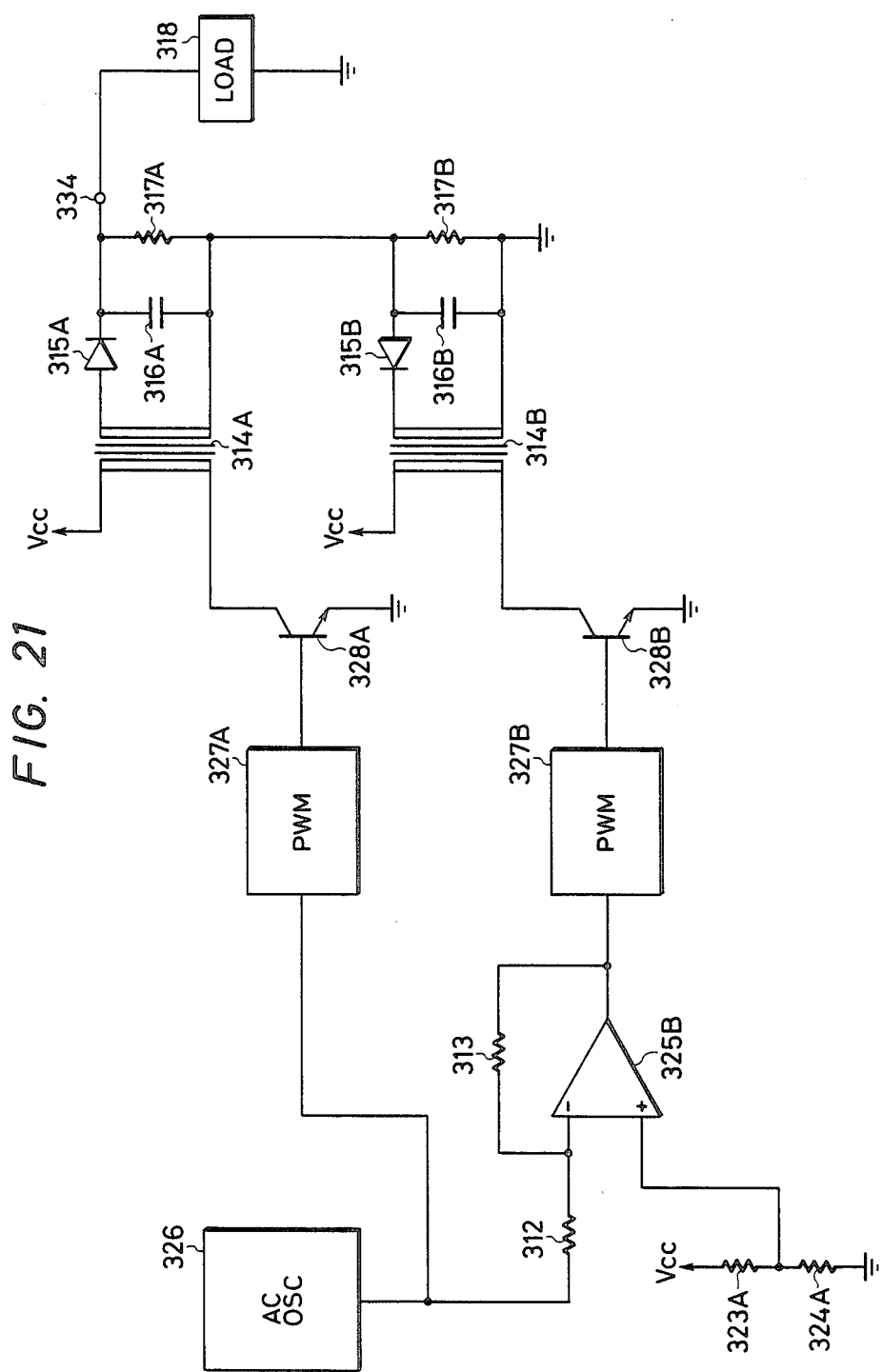
FIG. 21 is a circuit diagram of a high-voltage power source apparatus according to an embodiment, wherein outputs of two positive and negative high-voltage DC power sources are series-connected, and the output magnitudes are modulated.

FIG. 21 shows the circuit configuration of this embodiment. A low DC voltage Vcc is applied to one end of each of the primary sides of step-up transformers 314A and 314B. The collector of a switching transistor 328A or 328B is connected to the other end of the primary side of each transformer. The switching regulators 328A and 328B perform power supply control to the primary sides of the step-up transformers 314A and 314B.

Rectifier/smoothing circuits respectively consisting of diodes 315A and 315B, capacitors 316A and 316B, and discharging resistors 317A and 317B are connected to the secondary sides of the step-up transformers 314A and 314B. As shown in FIG. 21, the diodes 315A and 315B are connected in the opposite directions. The transformer 314A generates a positive voltage, while the transformer 314B generates a negative voltage. The two DC output ends are series-connected.

A sum of the voltages stepped up by the two transformers 314A and 314B is supplied to the load 318 through a terminal 334.

Power supply at the primary sides of the transformers 314A and 314B is controlled by PWMs (pulse width modulators) 327A and 327B. The PWMs 327A and 327B adjust the signal of the reference frequency from an AC oscillator 326 so as to change the drive pulse width of the transistors 328A and 328B.

Figure 22A:
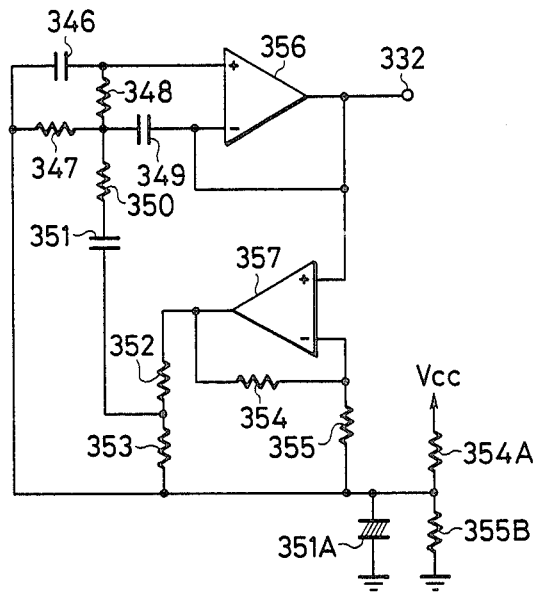
FIG. 22(A) is a circuit diagram showing in detail part of the circuit shown in FIG. 21.

FIG. 22(A) shows the detailed configuration of the AC oscillator 326 in FIG. 21.

Referring to FIG. 22(A), a voltage obtained by dividing the power source voltage Vcc by resistors 354A and 354B is applied to one input of a comparator circuit consisting of an operational amplifier 357 and resistors 354 and 355. The resistors 354 and 355 have the same resistance so that a voltage ½ the power source voltage Vcc is supplied to the comparator circuit. The input voltage is decoupled by a capacitor 351A and is stabilized. The comparator circuit consisting of the operational amplifier 357 compares an output voltage 332 from the AC oscillator 326 with an input voltage, and generates a rectangular wave. The gain of the rectangular wave is adjusted to a predetermined level by resistors 352 and 353. The wave is applied to a filter circuit constituting of resistors 347, 348, 350, capacitors 346, 349 and 351, and an operational amplifier 356. The sine wave is output through a signal line 332.

The sine wave from the AC oscillator 326 is supplied to the PWMs 327A and 327B. The AC signal supplied to the PWM 327B is inverted in phase, i.e., half-cycle shifted through an inverting amplifier consisting of resistors 312 and 313 and an operational amplifier 325B.

Figure 22B:
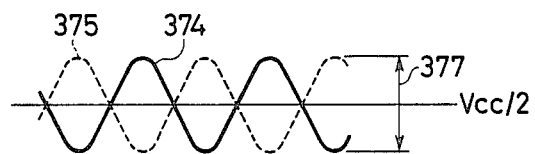
FIG. 22(B) is a diagram showing an input of a PWM.

FIG. 22(B) shows input signals to the PWMs 327A and 327B (the latter being half-cycle shifted).

Referring to FIG. 22(B), the waveform indicated by the dotted curve is the input waveform of the PWM 327B, and that indicated by the solid curve is the input waveform of the PWM 327A. The oscillation center potential is half the power source voltage Vcc and is obtained by voltage division by resistors 354A and 355B shown in FIG. 22(A). The center value is set to coincide with the voltage obtained by resistors 323A and 323B connected to the non-inverting input terminal of the operational amplifier 325B constituting the phase shifting circuit. An amplitude 377 of the AC signals is set by voltage-dividing resistors 352 and 353 of the AC oscillator 326.

The configuration of the PWMs 327A and 327B is indicated by the dotted line shown in FIG. 6. The operation waveform of the PWMs 327A and 327B is the same as that shown in FIG. 7.

The rectangular pulse obtained in this manner is amplified at a predetermined gain by a current amplification circuit (not shown), and the switching transistors 328A and 328B are driven.

The mode of operation of the apparatus having the above configuration will be described below.

A control signal obtained by the AC oscillator 326 is supplied to the PWMs 327A and 327B. The signal supplied to the PWM 327B is half-cycle shifted as shown in FIG. 22(B).

Figure 23:
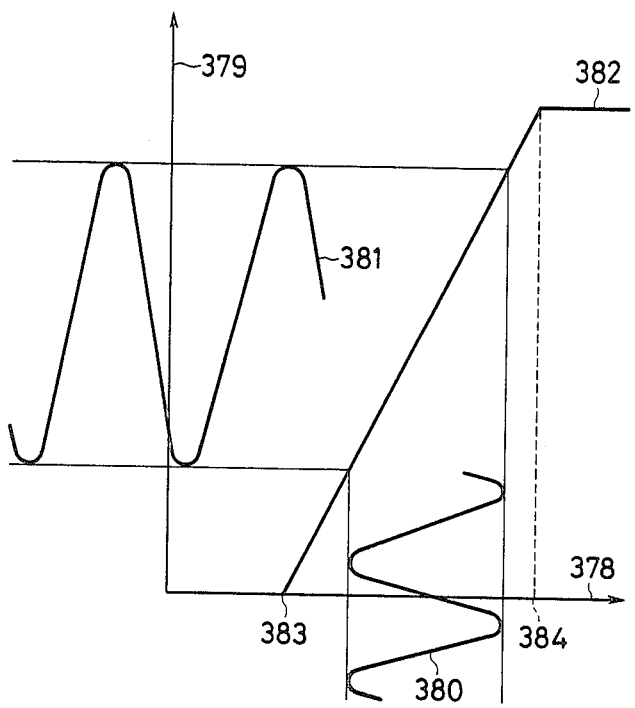
FIG. 23 is a diagram showing the input/output characteristics of the PWM.

The PWMs 327A and 327B have linear input/output characteristics as indicated by a line 328 in FIG. 23. Referring to FIG. 23, the abscissa 379 indicates the input voltage of the PWM, and the ordinate 379 indicates the absolute value of the high-voltage output. When a waveform as indicated by 380 is supplied to the PWM, a waveform indicated by 381 is supplied to the high-voltage output end. The secondary output end is rectified. When the level at the secondary output end is shifted by the AC oscillator 26, an AC voltage shifted to a desired DC level can be supplied to the load 318.

As can be seen from FIG. 23, a linear output can be obtained when the input voltage to the PWM remains within a range indicated by points 383 and 384. When the input value is lower than this range, the output is 0. When the input value exceeds the range, a maximum output is obtained.

Figure 24:
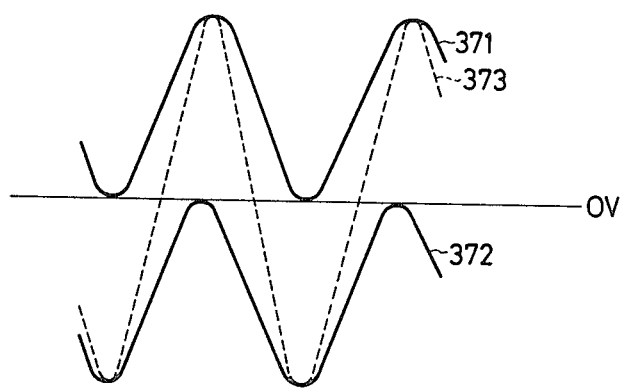
FIG. 24 is a waveform chart of a superposition output obtained by the embodiment shown in FIG. 21.

As described above, the sine wave input signals supplied to the PWMs 327A and 327B are shifted in phase by 180°. Therefore, the output waveforms from transformers 314A and 414B become as shown in FIG. 24. Referring to FIG. 24, the output at the side of the transformer 314A measured across the ends of a capacitor 316A after rectification has a waveform 371, and the output at the side of the transformer 314B measured across the ends of a capacitor 314B has a waveform 372.

Therefore, a synthetic output waveform obtained by series-connecting the transformers 314A and 314B has a waveform 373 in FIG. 24.

Figure 25:
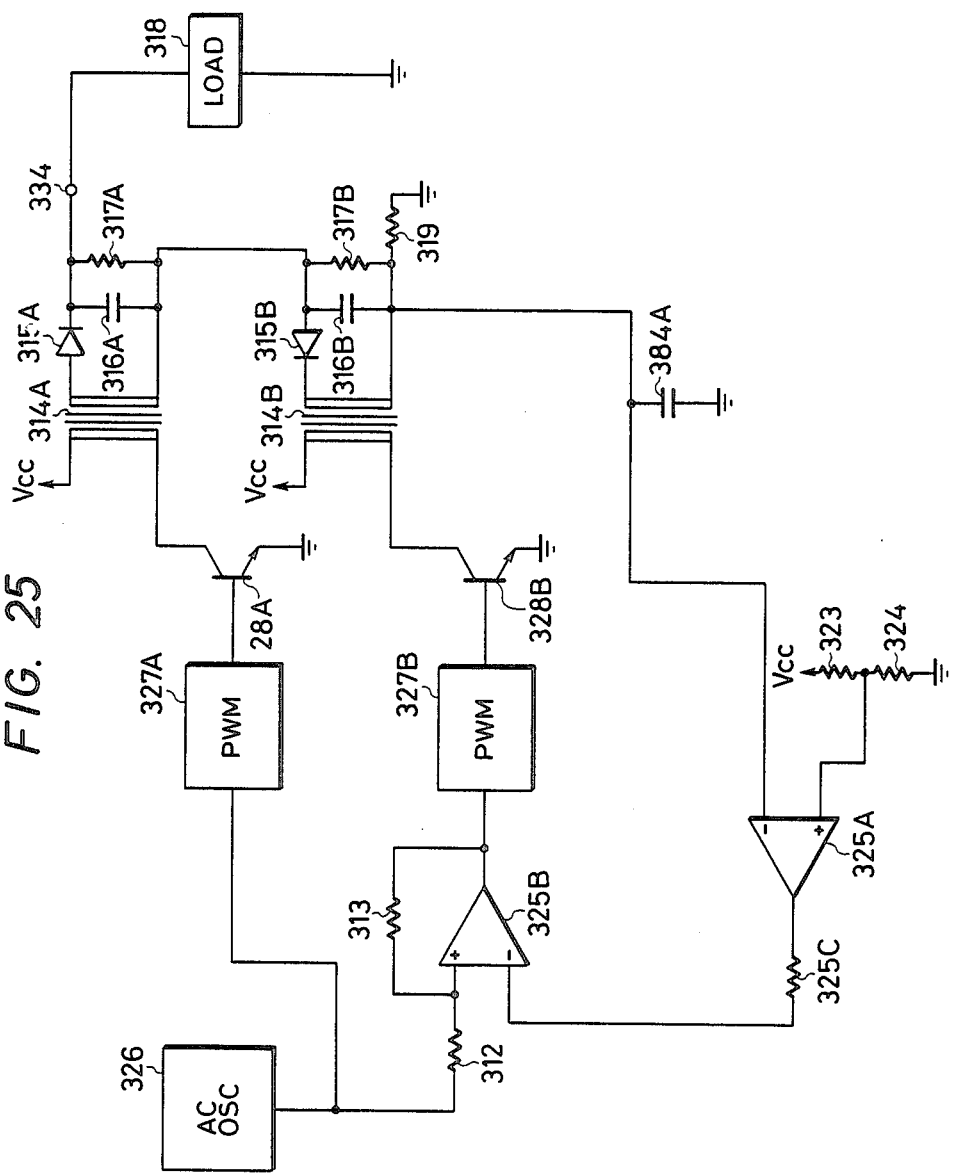
FIG. 25 is a circuit diagram showing the configuration of a modification of the embodiment shown in FIG. 21.
Figure 26:
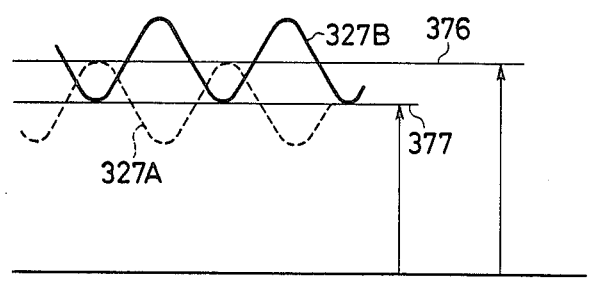
FIG. 26 is a waveform chart of an input signal supplied to a PWM shown in FIG. 25.

The high-voltage power apparatus, as shown in FIG. 21, can also perform constant current control such that the difference between the positive and negative currents at the secondary sides is kept constant. FIG. 25 shows the circuit configuration of this embodiment. The same reference numerals as in FIG. 21 denote the same parts as in FIG. 25. FIG. 26 shows input signals supplied to the PWMs 327A and 327B. The dotted curve shown in FIG. 26 indicates the input waveform of the PWM 327A. An oscillation center value 377 is obtained by voltage division by resistors 354A and 354B shown in FIG. 22(A). The waveform indicated the solid curve is the input waveform of the PWM 327B and has the same amplitude as that of the PWM 327A by properly setting the resistances of resistors 312 and 313 of the shifting circuit by an operational amplifier 325B. A center voltage 376 of the wave supplied to the PWM 327B is controlled by an error emplifier 325A to be described later.

A load current flowing to a load 318 is detected as a voltage through a detection resistor 319. The detected voltage is smoothed by a capacitor 384A, and is supplied to the inverting input terminal of an error amplifier comprising an operational amplifier 325A as the difference between the positive and negative currents at transformers 314A and 314B.

A reference voltage obtained by dividing the low power source voltage Vcc by resistors 323 and 324 is supplied to the non-inverting input terminal of the error amplifier 325A. An output from the error amplifier 325A is supplied to the non-inverting input terminal of the operational amplifier 325B and changes the central potential 376 shown in FIG. 26.

The mode of operation of the apparatus having the above configuration will be described below. Referring to FIG. 25, a high-voltage current flowing through the load 318 is detected as a voltage through the detection resistor 319. The detected voltage is smoothed by a capacitor 384, and is supplied to the inverting input terminal of an error amplifier comprising an operational amplifier 325A as the difference between the positive and negative currents of the transformers 314A and 314B.

The error amplifier 325A compares the reference potential obtained by the resistors 322 and 323 with the input at the inverting input terminal. When the difference between the positive and negative currents of the high-voltage output applied to the non-inverting input terminal is higher than the other input, the error amplifier generates a low level output. When the former is lower than the latter, the error amplifier generates a high level output. When the two inputs are the same, the error amplifier is stable.

In this manner, the phase-shifted control signal supplied to the PWM 327B is controlled in accordance with the difference between positive and negative currents of a high-voltage output.

Figure 27:
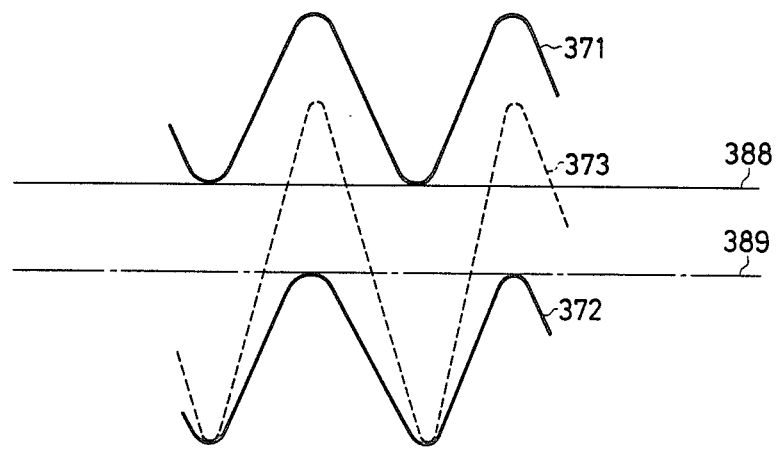
FIG. 27 is a waveform chart of a superposition output obtained in the embodiment shown in FIG. 25.

A synthetic output obtained by series-connection of the transformers 314A and 314B is biased in the negative direction as indicated by reference numeral 373 in FIG. 27. The waveform has levels 388 and 389 corresponding to the central values 377 and 376 of the input AC voltages of the PWMs 327A and 327B.

Although the present invention has been described with reference to an embodiment for performing constant current control wherein the difference between the positive and negative currents of the load current is kept constant, the present invention is similarly applicable to high-voltage power source apparatuses for controlling such that the difference between positive and negative components of a load voltage is kept constant.

Figure 28:
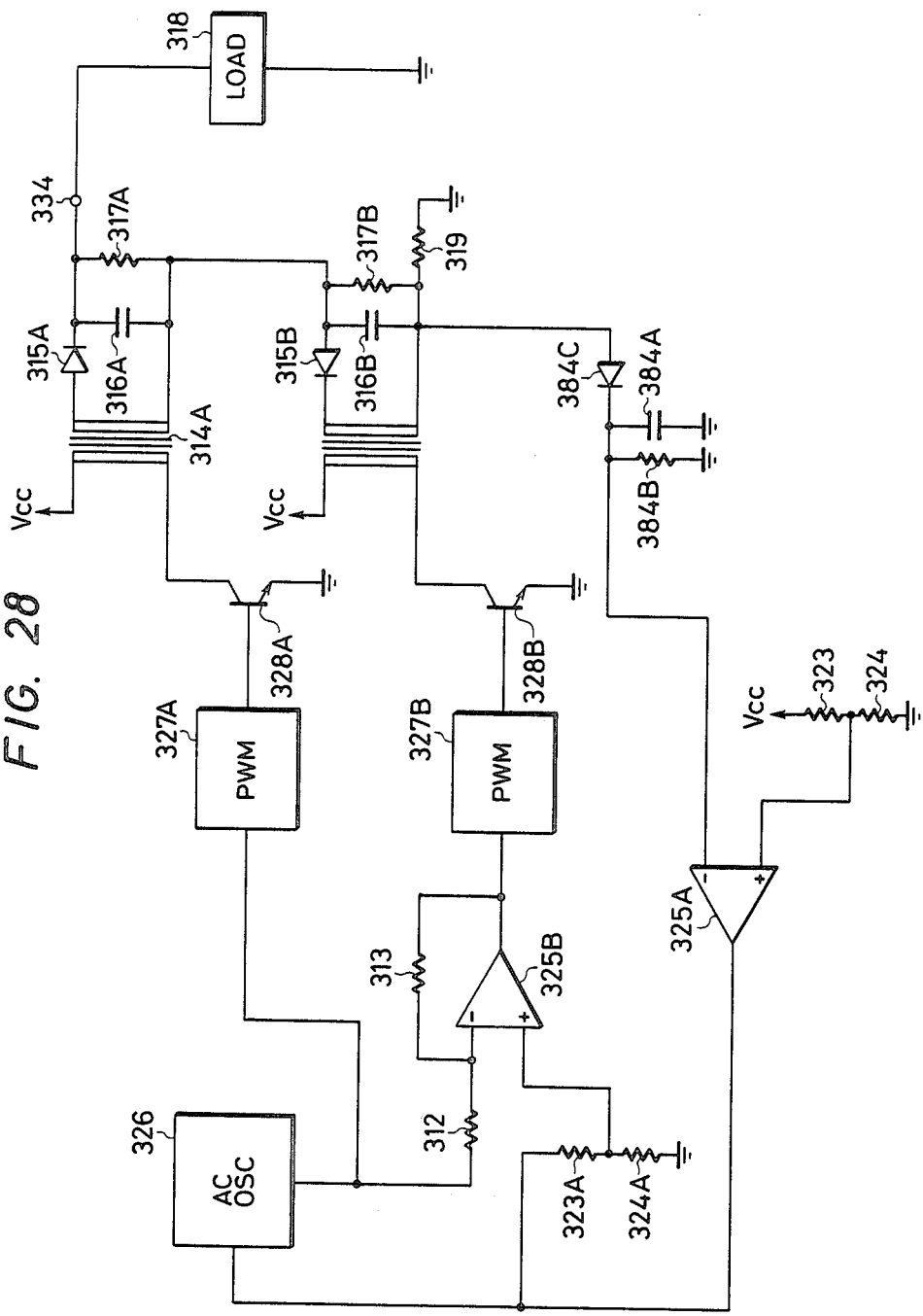
FIG. 28 is a circuit diagram showing the configuration of a modification of the embodiment shown in FIG. 21.

The high-voltage power source apparatus shown in FIG. 21 can be used to control constant current control such that a constant negative current flows to the secondary side. FIG. 28 shows the configuration for such an embodiment. The same reference numerals as in FIGS. 21 and 25 denote the same parts.

A load current flowing to a load 318 is detected as a voltage through a detection resistor 319. The detected voltage is rectified and smoothed by a diode 384C, a capacitor 384A and a resistor 384B. Only the negative component of the synthetic output current from transformers 314A and 314B is supplied to the inverting input terminal of an error amplifier comprising an operational amplifier 325A.

Figure 29:
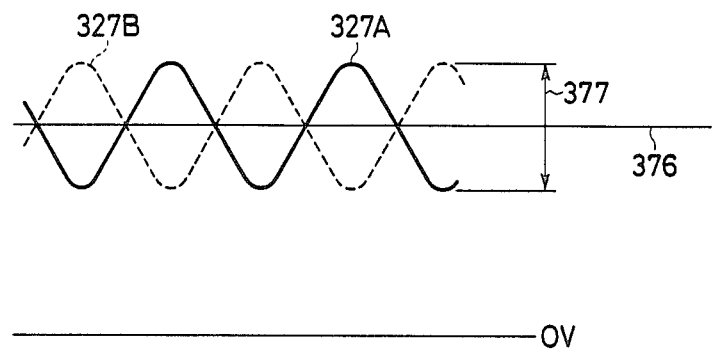
FIG. 29 is a diagram showing the input/output relationship of a PWM shown in FIG. 28.

The non-inverting input terminal of the error amplifier 325A receives a reference voltage obtained by dividing the low power source voltage Vcc by resistors 323 and 324. An output from the error amplifier 325A is supplied to the non-inverting input terminal of an operational amplifier 325B through attenuating resistors 323A and 324A. The central voltages of the input waveforms of PWMs 327A and 327B shown in FIG. 29 are set to be the same.

The mode of operation of the apparatus as described above will be described below.

Referring to FIG. 28, a high-voltage current flowing to the load 318 is detected as a voltage through a detection resistor 319. The detected voltage is rectified and smoothed by a diode 384C, a capacitor 384 and a resistor 384B. A value corresponding to the negative current component of the transformers 314A and 414B is supplied to the inverting input terminal of the error amplifier comprising the operational amplifier 325A.

The error amplifier 325A compares the input at the inverting input terminal and the reference voltage obtained through the resistors 322 and 323. When the difference between the positive and negative components of the high-voltage output at the non-inverting input terminal is higher than the other input, the error amplifier generates a signal of low level. When the former is lower than the latter, the error amplifier generates a signal of high level. The error amplifier is stable when the two inputs are equal.

The central potentials (376 in FIG. 29) of the control signals which are shifted in phase from each other for the PWMs 327A and 327B are controlled by the negative component of the synthetic high-voltage output.

The synthetic output wave obtained by series-connecting the transformers 314A and 314B has the waveforms as indicated by reference numeral 373 in FIG. 39.

Although the present invention has been described with reference to an embodiment for constant current control for obtaining a constant load current, the present invention can be similarly applied to a high-voltage power source apparatus which may be controlled to obtain a constant load voltage.

In this manner, a high-voltage output of low frequency equivalent to that obtained with a conventional system can be obtained. With the apparatus having the above configuration, the magnitude of the high-voltage output is shifted considerably at a predetermined frequency. Therefore, even if the output frequency is very low, magnetic saturation or a size increase due to the use of a transformer can be prevented. The overall apparatus can be rendered compact in size and light in weight.

In the above embodiment, the AC wave output by the AC oscillator 26 is a sine wave. However, a desired wave such as a rectangular wave, a sawtooth wave and a triangular wave can also be used. The output magnitude can also be changed in a desired pattern in accordance with the type of load.

The wave output from the AC oscillator 26 has a constant frequency in the above embodiment. However, the wave frequency can be changed in accordance with desired load characteristics.

A PWM is used as a control system of a high voltage in the above embodiment. However, high-voltage control can be performed using a series regulator or a switching regulator.

What is claimed is:

1. A high-voltage power source apparatus comprising:
    a transformer for receiving an input at a primary side of said transformer and producing a high-voltage output at a secondary side of said transformer;
    switching means for intermittently supplying electric power to the primary side of said transformer;
    first signal output means for outputting a switching signal for turning said switching means on and off;
    rectifying means for rectifying the high-voltage output at the secondary side of said transformer; and control means, including second signal output means for outputting a signal oscillating at a predetermined frequency different from that of the switching signal, for oscillating an output from said rectifying means at a predetermined frequency by means of controlling the primary side of said transformer in accordance with the signal from said second signal output means.

2. An apparatus according to claim 1, wherein said control means controls an output magnitude at the secondary side of said transformer by means of controlling said switching means or controlling the electric power at the primary side of said transformer.

3. An apparatus according to claim 2, wherein said control means has a circuit for performing constant current control or constant voltage control for obtaining a constant load current or voltage, respectively, of the high-voltage output at the secondary side of said transformer.

4. An apparatus according to claim 3, wherein said constant current or voltage control circuit has an error amplifier and controls the output magnitude of the high-voltage output at the secondary side of said transformer in accordance with an output from said error amplifier.

5. An apparatus according to claim 2, wherein said control means comprises, at the primary side of said transformer, switching regulator means for regulating the power supply so as to change the output magnitude of the high-voltage output at the secondary side of said transformer at a predetermined frequency, and means for performing constant current or voltage control of the high-voltage output at the secondary side of said transformer.

6. A high-voltage power source apparatus comprising:
- step-up means including a transformer for controlling an input at a primary side of said transformer and generating a high-voltage output at a secondary side of said transformer;
- rectifying means for rectifying the high-voltage output at the secondary side of said transformer; and
- control means for changing an output from said rectifying means at a predetermined frequency by means of controlling the primary side of said transformer,
- wherein said control means has a circuit for performing constant current control or constant voltage control for obtaining a constant load current or voltage, respectively, of the high-voltage output at the secondary side of said transformer, and said constant current or voltage control circuit has an error amplifier for comparing said constant load current or voltage of the high-voltage output with a reference value and a circuit for superposing an AC component of a predetermined waveform on an output from said error amplifier, whereby said control means controls an output magnitude at the secondary side of said transformer in accordance with an output of said constant current or voltage control circuit.

7. A high-voltage power source apparatus comprising:
- step-up means including a transformer for controlling an input at a primary side of said transformer and generating a high-voltage output at a secondary side of said transformer;
- rectifying means for rectifying the high-voltage output at the secondary side of said transformer; and
- control means for changing an output from said rectifying means at a predetermined frequency by means of controlling the primary side of said transformer,
- wherein said control means controls an output magnitude at the secondary side by controlling power at the primary side of said transformer, and said control means has means for controlling said primary side of said transformer by comparing a load current or voltage with a reference value, and means for changing the reference value in accordance with a predetermined frequency.

8. A high-voltage power source apparatus comprising:
- first step-up means having a first transformer for controlling an input at a primary side of said first transformer and generating a positive high voltage output at a secondary side of said first transformer;
- second step-up means having a second transformer for controlling an input at a primary side of said second transformer and generating a negative high-voltage output at a secondary side of said second transformer, said first and second step-up means being series-connected; and
- control means for changing the output magnitudes of the positive and negative high-voltage outputs of said first and second step-up means at a predetermined frequency and with a predetermined phase shift.

9. An apparatus according to claim 8, wherein said control means has a circuit for controlling the output magnitude of the high-voltage output such that a load current or voltage according to outputs of said first and second step-up means is constant.

10. An apparatus according to claim 9, wherein said control means controls the output magnitude of the high-voltage outputs in accordance with a negative component of the load current at the second side of said second transformer.

11. An apparatus according to claim 9, wherein said control means controls the output magnitudes of the high-voltage outputs such that a difference between the positive and negative currents or voltages at the secondary side of said first and second transformers is constant.

* * * * *

UNITED STATES PATENT AND TRADEMARK OFFICE
CERTIFICATE OF CORRECTION

PATENT NO. : 4,731,720        Page 1 of 4

DATED : March 15, 1988

INVENTOR(S) : K. Takahashi

It is certified that error appears in the above-identified patent and that said Letters Patent is hereby corrected as shown below:

COLUMN 1

Line 30, "windinq" should read --winding--.

COLUMN 3

Line 41, "resistors 19 to 22" should read
--resistors 19, 21 and 22--.

COLUMN 4

Line 11, "generator" should read --generated--.
Line 58, "applied" should read --applies--.
Line 61, "obtianed" should read --obtained--.
Lines 66-7, "V92(Vcc-V32-Vf) {(R62+R64)/
(R65+R66+R-62+R64)}+V32+Vf"
should read
--V92=(Vcc-V32-Vf) {(R62+R64)/
(R65+R66+R62+R64)}+V32+Vf--.

COLUMN 5

Line 46, "resistor" should read --resistors--.

UNITED STATES PATENT AND TRADEMARK OFFICE
CERTIFICATE OF CORRECTION

PATENT NO. : 4,731,720
DATED : March 15, 1988
INVENTOR(S) : K. Takahashi

It is certified that error appears in the above-identified patent and that said Letters Patent is hereby corrected as shown below:

COLUMN 6

Line 55, "emboidment" should read --embodiment--.

COLUMN 7

Line 9, "resistors 120 to 123" should read
        --resistors 120, 121 and 123--.
    Line 27, "amplifier 12." should read
        --amplifier 122.--.
    Line 29, "input of" should read
        --input terminal of--.
    Line 50, "regulator 17," should read
        --regulator 117,--.

COLUMN 8

Line 11, "step" should read --step- --.
    Line 60, "into" should read --to--.
    Line 62, "registor" should read --resistor--.

COLUMN 9

Line 9, "capacitor 230" should read
        --capacitor 235--.
    Line 37, "as the" should read --as that--.

UNITED STATES PATENT AND TRADEMARK OFFICE
CERTIFICATE OF CORRECTION

PATENT NO. : 4,731,720

DATED : March 15, 1988

INVENTOR(S) : K. Takahashi

It is certified that error appears in the above-identified patent and that said Letters Patent is hereby corrected as shown below:

COLUMN 10

Line 4, "emboidment." should read --embodiment.--.
Line 43, "registor" should read --resistor--.

COLUMN 11

Line 29, "354B" should read --355B--.

COLUMN 12

Line 12, "line 328" should read --line 382--.
Line 13, "abscissa 379" should read --abscissa 378--.
Line 20, "oscillator 26, should read --oscillator 326,--.
Line 31, "414B" should read --314B--.
Line 36, "capacitor 314B" should read --capacitor 316B--.
Line 50, "354B" should read --355B--.
Line 51, "indicated the" should read --indicated by the--.

UNITED STATES PATENT AND TRADEMARK OFFICE
CERTIFICATE OF CORRECTION

PATENT NO. : 4,731,720

DATED : March 15, 1988

INVENTOR(S) : K. Takahashi

It is certified that error appears in the above-identified patent and that said Letters Patent is hereby corrected as shown below:

COLUMN 14

Figure 30:
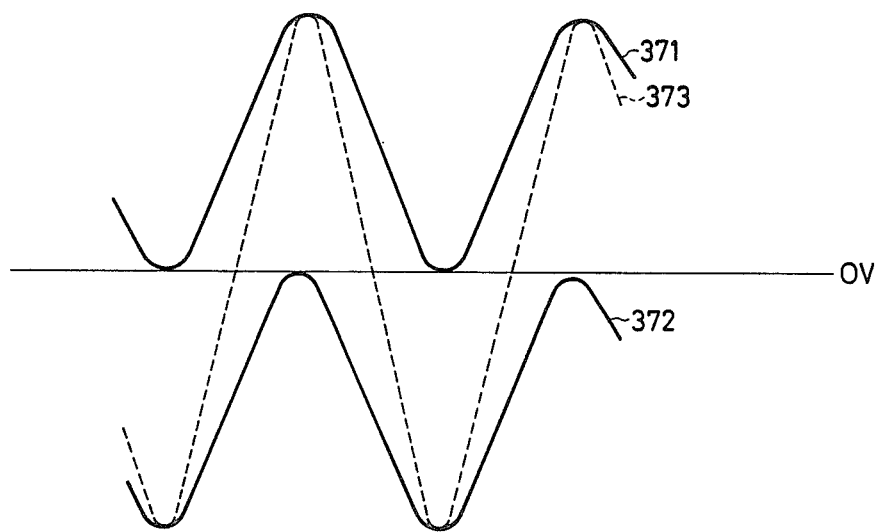
FIG. 30 is a diagram showing a superposition output waveform obtained in the embodiment shown in FIG. 28.

Line 4, "capacitor 384" should read --capacitor 384A--.
    Line 6, "414B" should read --314B--.
    Line 25, "FIG. 39." should read --FIG. 30.--

COLUMN 16

Line 28, "high voltage" should read --high-voltage--.
    Line 50, "second" should read --secondary--.

Signed and Sealed this

Eighteenth Day of October, 1988

*Attest:*

DONALD J. QUIGG

*Attesting Officer*    *Commissioner of Patents and Trademarks*